United States Patent
Ainslie (10) Patent No.: US 9,800,628 B2
(45) Date of Patent: *Oct. 24, 2017

(54) SYSTEM AND METHOD FOR TAGGING IMAGES IN A SOCIAL NETWORK

(71) Applicant: Google Inc., Mountain View, CA (US)

(72) Inventor: Alex Ainslie, San Francisco, CA (US)

(73) Assignee: Google Inc., Mountain View, CA (US)

( * ) Notice: Subject to any disclaimer, the term of this patent is extended or adjusted under 35 U.S.C. 154(b) by 567 days.

This patent is subject to a terminal disclaimer.

(21) Appl. No.: 14/461,726

(22) Filed: Aug. 18, 2014

(65) Prior Publication Data

US 2015/0081787 A1 Mar. 19, 2015

Related U.S. Application Data

(63) Continuation of application No. 13/358,064, filed on Jan. 25, 2012, now Pat. No. 8,826,150.

(51) Int. Cl.
| | |
|---|---|
| *G06F 3/00* | (2006.01) |
| *H04L 29/06* | (2006.01) |
| *H04N 1/32* | (2006.01) |
| *H04W 4/20* | (2009.01) |
| *H04L 29/08* | (2006.01) |

(52) U.S. Cl.
CPC ....... *H04L 65/403* (2013.01); *H04N 1/32101* (2013.01); *H04W 4/206* (2013.01); *H04L 65/40* (2013.01); *H04L 67/10* (2013.01)

(58) Field of Classification Search
CPC combination set(s) only.
See application file for complete search history.

(56) References Cited

U.S. PATENT DOCUMENTS

| | | | |
|---|---|---|---|
| 7,847,815 B2 | 12/2010 | Patel et al. | |
| 2009/0327885 A1* | 12/2009 | Aoki | G06Q 10/10 715/700 |
| 2011/0044512 A1 | 2/2011 | Bambha et al. | |
| 2011/0148857 A1 | 6/2011 | Krupka et al. | |
| 2011/0184982 A1* | 7/2011 | Adamousky | G06F 11/302 707/776 |
| 2011/0231506 A1 | 9/2011 | Enete et al. | |
| 2012/0011197 A1 | 1/2012 | Arisawa et al. | |
| 2012/0045093 A1 | 2/2012 | Salminen et al. | |
| 2012/0054691 A1 | 3/2012 | Nurmi | |

(Continued)

*Primary Examiner* — Hien Duong
(74) *Attorney, Agent, or Firm* — IP Spring (57) ABSTRACT

A method for tagging images in a social network is provided. The method may include enabling a capture of an image associated with an online group discussion. The method may further include allowing an automatic tagging of the image associated with the online group discussion, the image including a visual representation of a first participant of the online group discussion. The method may also include providing the first participant with an option to indicate whether to approve distribution of the tagged image. The method may also include receiving an indication from the first participant whether to approve the distribution of the tagged image. When the indication from the first participant whether to approve the distribution of the tagged image indicates approval of the distribution, the method may further include distributing the tagged image, based at least in part on the indication of approval of distribution of the tagged image.

20 Claims, 6 Drawing Sheets (56) References Cited

U.S. PATENT DOCUMENTS

| | | |
|---|---|---|
| 2012/0056972 A1 | 3/2012 | Benedeki et al. |
| 2012/0159385 A1 | 6/2012 | Duncan et al. |
| 2012/0166545 A1 | 6/2012 | Alexandrov et al. |
| 2012/0250951 A1 | 10/2012 | Chen |
| 2012/0288201 A1 | 11/2012 | Raju |
| 2013/0117692 A1 | 5/2013 | Padmanabhan et al. |

* cited by examiner

SYSTEM AND METHOD FOR TAGGING IMAGES IN A SOCIAL NETWORK

CROSS-REFERENCE TO RELATED APPLICATIONS

This application is a continuation of U.S. application Ser. No. 13/358,064, filed Jan. 25, 2012, the disclosure of which is expressly incorporated herein by reference in its entirety.

TECHNICAL FIELD

This disclosure relates to social networking systems and, more particularly, to a method of tagging images associated with a social networking system.

BACKGROUND

A social network (e.g., FACEBOOK™, MYSPACE™, LINKEDIN™, TWITTER™, GOOGLE+™, etc.) may refer to an online system that provides a forum for geographically separated users to interact with one another, where those users have defined a relationship between one another. Users may control who can view their information by identifying particular relationships with other users, and can also find new users from the group of other people who are "friends" of their own friends. Social networks may be aimed at different types of social interaction, such as friendship and business networking. A user of a social network may have a profile page (e.g., a web page on the social network) that provides information about the user to other users of the social network. A profile may include information regarding a user's acquaintance relationships (e.g., friends, colleagues, schoolmates, etc.) on the social network.

Some social networking websites provide real-time chat capabilities (e.g. live video chat such as that available through Google+) that may enable two or more individuals to communicate in a live forum. In some cases, a user may want to take a screenshot of the participants of the forum. However, existing screencapture software may require the user to manually tag any images associated with the screenshot.

SUMMARY OF DISCLOSURE

In one implementation, a method, in accordance with this disclosure, may include enabling, using the one or more computing devices, a capture of an image associated with an online group discussion, said online group discussion including two or more participants. The method may further include allowing an automatic tagging, using the one or more computing devices, of the image associated with the online group discussion, the image including a visual representation of a first participant of the two or more participants of the online group discussion. The method may also include providing, using the one or more computing devices, the first participant with an option to indicate whether to approve distribution of the tagged image. The method may also include receiving an indication from the first participant whether to approve the distribution of the tagged image. When the indication from the first participant whether to approve the distribution of the tagged image indicates approval of the distribution, the method may further include distributing the tagged image, based at least in part on the indication of approval of distribution of the tagged image.

One or more of the following features may be included. The method may include transmitting the tagged image to a computing device that is not associated with the online group discussion. In some embodiments, the tagged image may be at least one of a screenshot and a video image. The method may further include storing the image in one or more memory devices. In some embodiments, the tagged image may include a plurality of images, each image corresponding to a visual representation of a different participant of the two or more participants of the online group discussion. In some embodiments, the tagged image may be tagged with identification information corresponding to each participant of the two or more participants of the online group discussion.

In another implementation, a computer program product residing on a computer readable storage medium having a plurality of instructions stored thereon is provided. In some embodiments, the instructions, which when executed by a processor, cause the processor to perform one or more operations. Some operations may include enabling, using the one or more computing devices, a capture of an image associated with an online group discussion, said online group discussion including two or more participants. Operations may further include allowing an automatic tagging, using the one or more computing devices, of the image associated with the online group discussion, the image including a visual representation of a first participant of the two or more participants of the online group discussion. Operations may also include providing, using the one or more computing devices, the first participant with an option to indicate whether to approve distribution of the tagged image. Operations may also include receiving an indication from the first participant whether to approve the distribution of the tagged image. When the indication from the first participant whether to approve the distribution of the tagged image indicates approval of the distribution, operations may further include distributing the tagged image, based at least in part on the indication of approval of distribution of the tagged image.

One or more of the following features may be included. Operations may include transmitting the tagged image to a computing device that is not associated with the online group discussion. In some embodiments, the tagged image may be at least one of a screenshot and a video image. Operations may further include storing the image in one or more memory devices. In some embodiments, the tagged image may include a plurality of images, each image corresponding to a visual representation of a different participant of the two or more participants of the online group discussion. In some embodiments, the tagged image may be tagged with identification information corresponding to each participant of the two or more participants of the online group discussion.

In another implementation, a computing system is provided. In some embodiments, the computing system may include one or more processors configured to enable a capture of an image associated with an online group discussion, said online group discussion including two or more participants. The one or more processors may be further configured to allow an automatic tagging of the image associated with the online group discussion, the image including a visual representation of a first participant of the two or more participants of the online group discussion. The one or more processors may be further configured to provide the first participant with an option to indicate whether to approve distribution of the tagged image. The one or more processors may be further configured to receive an indication from the first participant whether to approve the distribution of the tagged image. When the indication from the first participant whether to approve the distribution of the tagged image indicates approval of the distribution, the one or more processors may be further configured to distribute the tagged image, based at least in part on the indication of approval of distribution of the tagged image.

One or more of the following features may be included. The one or more processors may be further configured to transmit the tagged image to a computing device that is not associated with the online group discussion. In some embodiments, the tagged image may be at least one of a screenshot and a video image. The one or more processors may be further configured to store the image in one or more memory devices. The tagged image may include a plurality of images, each image corresponding to a visual representation of a different participant of the two or more participants of the online group discussion. The tagged image may be tagged with identification information corresponding to each participant of the two or more participants of the online group discussion.

In another implementation, a method, in accordance with this disclosure, may include enabling, using the one or more computing devices, a capture of an image associated with an online group discussion having a plurality of participants, the image including a plurality of visual representations, each visual representation corresponding to one of the plurality of participants of the online group discussion. The method may further include allowing an automatic tagging, using the one or more computing devices, of the image associated with the online group discussion, wherein the automatic tagging includes tagging each of the plurality of visual representations. The method may also include providing, using the one or more computing devices, each of the plurality of participants of the online group discussion with an option to approve or deny distribution of the tagged image.

The details of one or more implementations are set forth in the accompanying drawings and the description below. Other features and advantages will become apparent from the description, the drawings, and the claims.

DETAILED DESCRIPTION OF THE EMBODIMENTS

Embodiments herein provide techniques for tagging images in a social network. Some social networking websites provide real-time chat capabilities that may enable two or more individuals to communicate in a live forum. Occasionally during these chat sessions a user may wish to take a screenshot of the participants in the video chat, tag the other users in the screenshot, and share the screenshot with others.

For example, included within the some social networks is the ability to participate in synchronous communication sessions, which may include multiuser video chat rooms (one example may include "Hangouts" in Google+). These synchronous communication sessions may allow for virtual gatherings of people to chat about specific topics. Embodiments herein provide an improvement to a "hangouts" type setting, which allows users to take a screenshot of the participants in the chat. Some embodiments included herein may also allow for the automatic tagging of the users in the screenshot with their identification information, and then allow for the sharing of the screenshot with others.

More specifically, embodiments included herein may provide a single button or other mechanism(s) on the graphical user interface that enables capturing, tagging, and sharing an image. Embodiments included herein may also provide the participants shown in the screenshot with the option of either allowing the screenshot to be shared and/or denying others from accessing the screenshot. In some embodiments, the image may be a video instead of a static image such as a screenshot.

Example System:

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present disclosure may be written in an object oriented programming language such as Java, JavaScript, Python, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
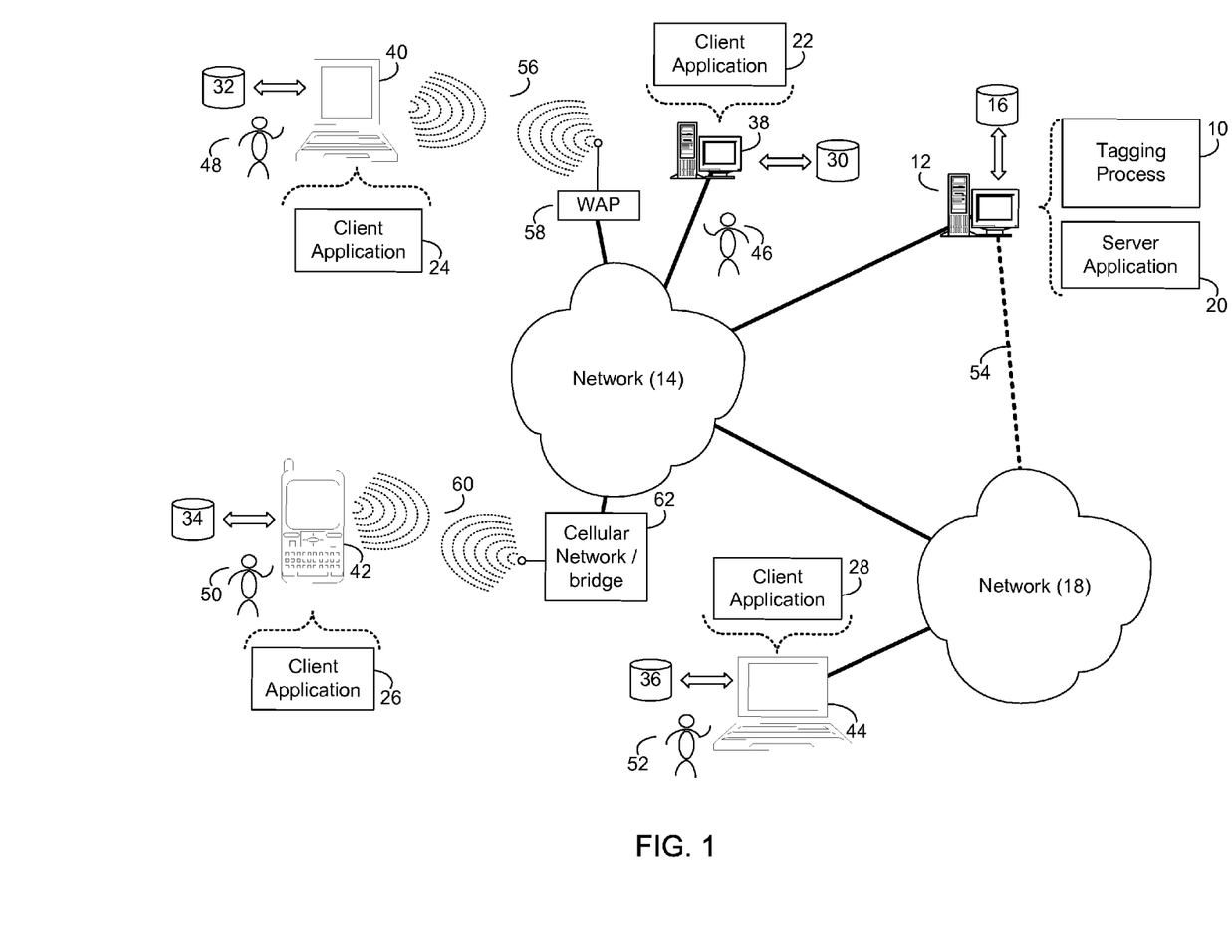
FIG. 1 is a diagrammatic view of a tagging process coupled to a distributed computing network in accordance with an embodiment of the present disclosure.

Referring to FIG. 1, there is shown a tagging process 10 and server application 20 that may each reside on and may be executed by computer 12, which may be connected to network 14 (e.g., the Internet or a local area network). Server application 20 may include some or all of the elements of tagging process 10 described herein. Examples of computer 12 may include but are not limited to a single server computer, a series of server computers, a single personal computer, a series of personal computers, a mini computer, a mainframe computer, an electronic mail server, a social network server, a text message server, a photo server, a multi-processor computer, one or more virtual machines running on a computing cloud, and/or a distributed system. The various components of computer 12 may execute one or more operating systems, examples of which may include but are not limited to: Microsoft Windows Server™; Novell Netware™; Redhat Linux™, Unix, or a custom operating system, for example.

Figure 3:
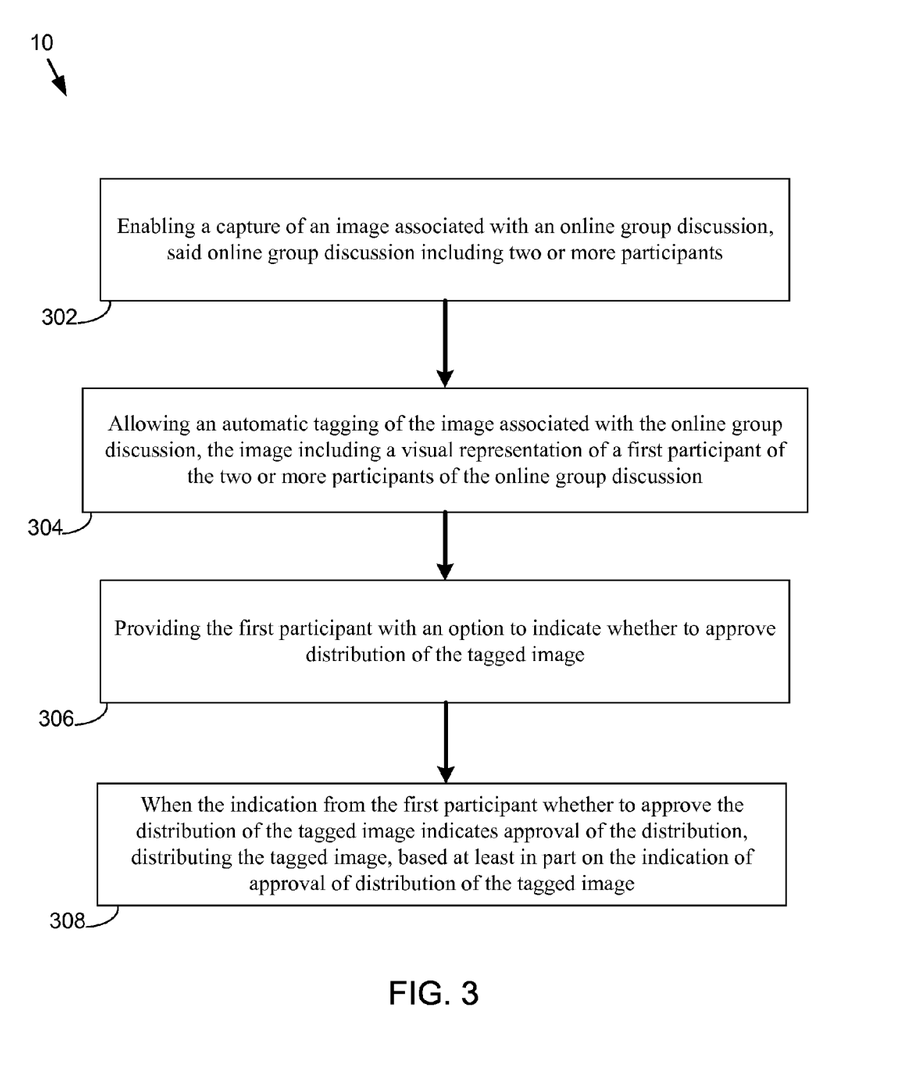
FIG. 3 is a flowchart of the tagging process of FIG. 1 in accordance with an embodiment of the present disclosure.

As will be discussed below in greater detail, tagging process 10 may include enabling (302), using the one or more computing devices, a capture of an image associated with an online group discussion, said online group discussion including two or more participants. The method may further include allowing (304) an automatic tagging, using the one or more computing devices, of the image associated with the online group discussion, the image including a visual representation of a first participant of the two or more participants of the online group discussion. The method may also include providing (306), using the one or more computing devices, the first participant with an option to indicate whether to approve distribution of the tagged image. The method may also include receiving an indication from the first participant whether to approve the distribution of the tagged image. When the indication from the first participant whether to approve the distribution of the tagged image indicates approval of the distribution, the method may further include distributing (308) the tagged image, based at least in part on the indication of approval of distribution of the tagged image.

The instruction sets and subroutines of tagging process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Tagging process 10 may be accessed via client applications 22, 24, 26, 28. Examples of client applications 22, 24, 26, 28 may include but are not limited to a standard web browser, a customized web browser, or a custom application that can display data to a user. The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively).

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 may include, but are not limited to, personal computer 38, laptop computer 40, smart phone 42, notebook computer 44, a server (not shown), a data-enabled, cellular telephone (not shown), and a dedicated network device (not shown).

One or more of client applications 22, 24, 26, 28 may be configured to effectuate some or all of the functionality of tagging process 10. Accordingly, tagging process 10 may be a purely server-side application, a purely client-side application, or a hybrid server-side/client-side application that is cooperatively executed by one or more of client applications 22, 24, 26, 28 and tagging process 10.

Users 46, 48, 50, 52 may access computer 12 and tagging process 10 directly through network 14 or through secondary network 18. Further, computer 12 may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Smart phone 42 is shown wirelessly coupled to network 14 via wireless communication channel 60 established between smart phone 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and smart phones to be interconnected using a short-range wireless connection.

Client electronic devices 38, 40, 42, 44 may each execute an operating system, examples of which may include but are not limited to Apple iOS™, Microsoft Windows™, Android™, Redhat Linux™, or a custom operating system.

A number of users 46, 48, 50, and 52 of the client devices 38, 40, 42, 44, respectively, may access the server device 12 to participate in a social networking service. For example, the client devices 38, 40, 42, 44 can execute web browser applications that can be used to access the social networking service. In another example, the client devices 38, 40, 42, 44 may execute software applications that are specific to the social network (e.g., social networking "apps" running on smartphones).

The users 46, 48, 50, and 52 may participate in the social networking service provided by server device 12 by posting information, such as text comments (e.g., updates, announcements, replies), digital photos, videos, or other appropriate electronic information. In some implementations, information can be posted on a user's behalf by systems and/or services external to the social network or the server device 112. For example, the user 46 may post a review of a movie to a movie review website, and with proper permissions that website may cross-post the review to the social network on the user's 46 behalf. In another example, a software application executing on a mobile device, with proper permissions, may use global positioning system (GPS) capabilities to determine the user's location and automatically update the social network with his location (e.g., "At Home", "At Work", etc.).

Example Social Network

Figure 2:
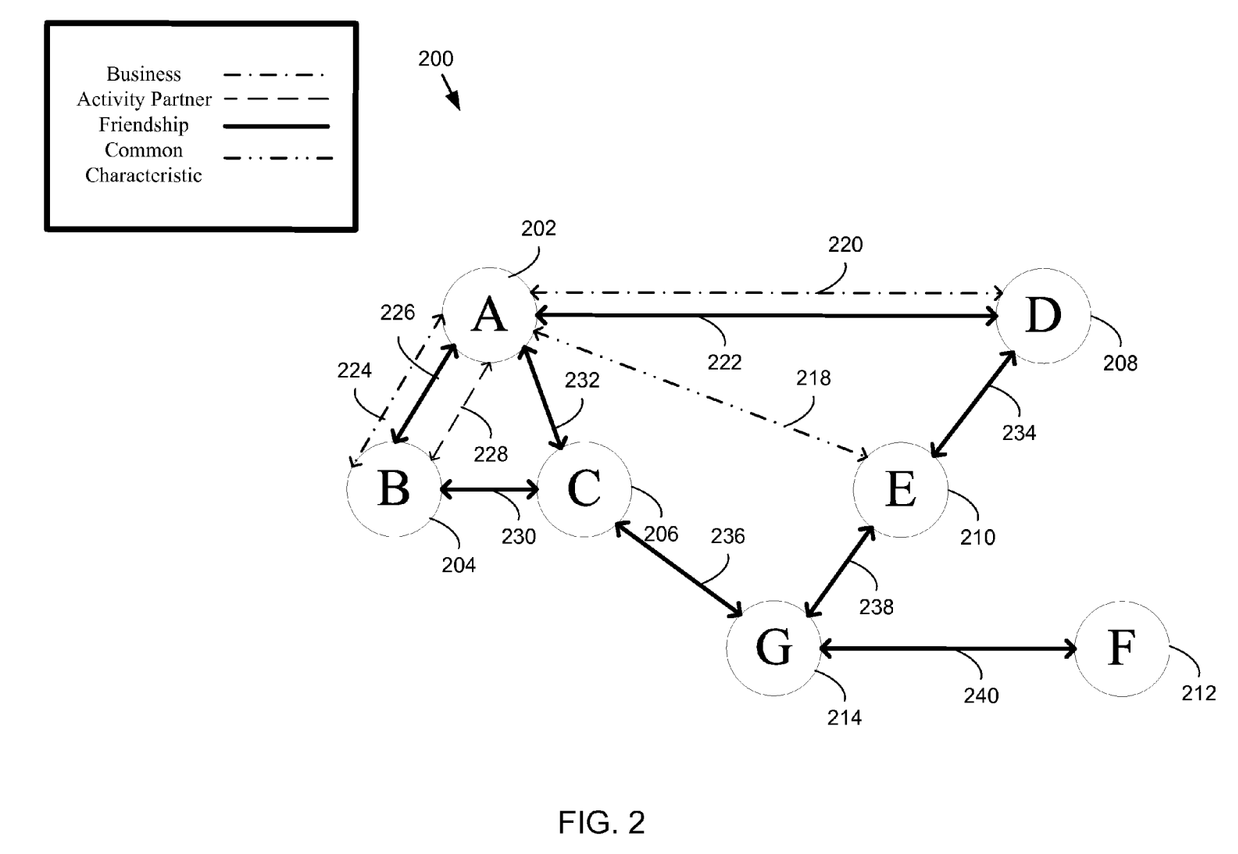
FIG. 2 is a diagram depicting a social network in accordance with an embodiment of the present disclosure.

Referring now to FIG. 2, a diagram of a social network 200 according to one embodiment of the present disclosure is provided. According to the embodiment illustrated in FIG. 2, the social network 200 is illustrated with a graph comprising vertices 202, 204, 206, 208, 210, 212, and 214 and edges 218, 220, 222, 224, 226, 228, 230, 232, 234, 236, 238, and 240. The vertices 202, 204, 206, 208, 210, 212, and 214 may comprise profiles A, B, C, D, E, F, and G respectively.

As used herein, the phrase "social network profile" may refer to a member profile of a member of the social network 200. According to another embodiment, one or more of the vertices can represent a community. The methods and systems discussed below are equally applicable to an embodiment where the vertices may comprise one or more communities, but for purposes of illustration, the vertices depicted in FIG. 2 represent member profiles. The exemplary network 200 shown in FIG. 2 has seven members. Considerably more members can be part of the social network 200. A member may be an entity such as, for example, a person, an organization, a business, a corporation, a community, a fictitious person, or other suitable entity.

In some embodiments, each member profile may contain entries, and each entry may comprise information associated with a profile. For example, a person's member profile may contain: personal information, such as relationship status, birth date, age, children, ethnicity, religion, political view, sense of humor, sexual orientation, fashion preferences, smoking habits, drinking habits, pets, hometown location, passions, sports, activities, favorite books or music, TV or movie preferences, and favorite cuisines; contact information, such as email addresses, location information, instant messenger name, telephone numbers, and address; professional information, such as job title, employer, and skills; educational information, such as schools attended and degrees obtained, and any other suitable information describing, identifying, or otherwise associated with a person. A particular business member profile may, for example, contain a description of the business, and information about its market sector, customer base, location, suppliers, net profits, net worth, number of employees, stock performance, contact information, and other types of suitable information associated with the business.

A member profile may also contain rating information associated with the member. For example, the member can be rated or scored by other members of the social network 200 in specific categories, such as humor, intelligence, fashion, trustworthiness, etc. A member's category ratings may be contained in the member's profile. In one embodiment of the social network, a member may have fans. Fans may be other members who have indicated that they are "fans" of the member. Rating information may also include the number of fans of a member and identifiers of the fans. Rating information may also include the rate at which a member accumulated ratings or fans and how recently the member has been rated or acquired fans.

A member profile may also contain social network activity data associated with the member. This membership information may include information about a member's login patterns to the social network, such as the frequency that the member logs in to the social network and the member's most recent login to the social network. Membership information may also include information about the rate and frequency that a member profile gains associations to other member profiles. In a social network that comprises advertising or sponsorship, a member profile may contain consumer information. Consumer information may include the frequency, patterns, types, or number of purchases the member makes, or information about which advertisers or sponsors the member has accessed, patronized, or used. Each member may be given the opportunity to opt out from providing any information that the member does not wish to share. In some embodiments, member information will not be recorded and/or provided to sponsors or others unless the member has specifically opted-into such sharing.

A member profile may comprise data stored in memory. The profile, in addition to comprising data about the member, may also comprise data relating to others. For example, a member profile may contain an identification of associations or virtual links with other member profiles. In one embodiment, a member's social network profile may comprise a URL, which may be stored in association with another member's profile. In one such association, the other member's profile may contain a reciprocal association (e.g. a hyperlink, URL, etc.) associated with the first member's profile. A member's profile may also contain information excerpted from another associated member's profile, such as a thumbnail image of the associated member, his or her age, marital status, and location, as well as an indication of the number of members with which the associated member is associated. In one embodiment, a member's profile may comprise a list of other social network members' profiles with which the member wishes to be associated.

In some embodiments, an association may be designated manually or automatically. For example, a member may designate associated members manually by selecting other profiles and indicating an association that may be recorded in the member's profile. According to one embodiment, associations may be established by an invitation and an acceptance of the invitation. For example, a first user may send an invitation to a second user inviting the second user to form an association with the first user. The second user may then accept or reject the invitation. According to one embodiment, if the second user rejects the invitation, a one-way association may be formed between the first user and the second user. According to another embodiment, if the second user rejects the association, no association may be formed between the two users. Also, an association between two profiles may comprise an association automatically generated in response to a predetermined number of common entries, aspects, or elements in the two members' profiles. In one embodiment, a member profile may be associated with all of the other member profiles comprising a predetermined number or percentage of common entries, such as interests, hobbies, likes, dislikes, employers and/or habits. Associations designated manually by members of the social network, or associations designated automatically based on data input by one or more members of the social network, may be referred to as user established associations. In some embodiments, a user may form an association with a second user by adding them to a group (e.g. a circle). The second user may receive a notification that he or she has been added to the first user's group (e.g. circle).

Associations between profiles within a social network can be of a single type or can be multiple types and can include, for example, friendship associations, business associations, family associations, community associations, school associations, or any other suitable type of link between profiles. Associations may further be weighted to represent the strength of the association. For example, a friendship association can be weighted more than a school association. Each type of association can have various levels with different weights associated with each level. For example, a friendship association may be classified according to which of a plurality of friendship association levels it belongs to. In one embodiment, a friendship association may be assigned a level by the member from a list of levels comprising: a best friend, a good friend, a regular friend, an acquaintance, and a friend the member has not met.

Example Image Tagging Process:

As discussed above, one or more of users 46, 48, 50, 52 may access computer 12 and tagging process 10 through network 14 or secondary network 18. For example, and for illustrative purposes only, assume that user 46 (i.e., the user of personal computer 38) wishes to use tagging process 10. User 46 may access tagging process 10 through client application 22 associated with personal computer 38. In this way, tagging process 10 may operate as a standalone application or alternatively as an applet or plug-in operating within a separate program such as server application 20. In some embodiments, server application 20 may include a social networking application such as, but not limited to, GOOGLE+™, FACEBOOK™, MYSPACE™, LINKEDIN™, TWITTER™, etc. Although, this particular example focuses upon user 46 and personal computer 38 it should be noted that this disclosure is not meant to be limited to this particular example as laptop computer 40, smart phone 42, notebook computer 44, etc., may also be used to access and/or render some or all of the embodiments of tagging process 10 described herein.

As such, and referring now to FIGS. 3-6, when user 46 accesses server application 20 (e.g. GOOGLE+) via client application 22 display screen 400 may be rendered at personal computer 38. Display screen 400 may include one or more participant screens (e.g. 402, 404, 406, 408, 410) each of which may be configured to display a participant of an online video group discussion. For example, participant screen 402 may display video of User A, participant screen 404 may display video of User B, participant screen 406 may display video of User C, participant screen 408 may display video of User D, and participant screen 410 may display video of User E. In some embodiments, the participants' screens may be displayed in the order in which they entered the online video group discussion. Although, five participant screens are shown in this particular example it should be noted that any number may be displayed without departing from the scope of the present disclosure.

Figure 4:
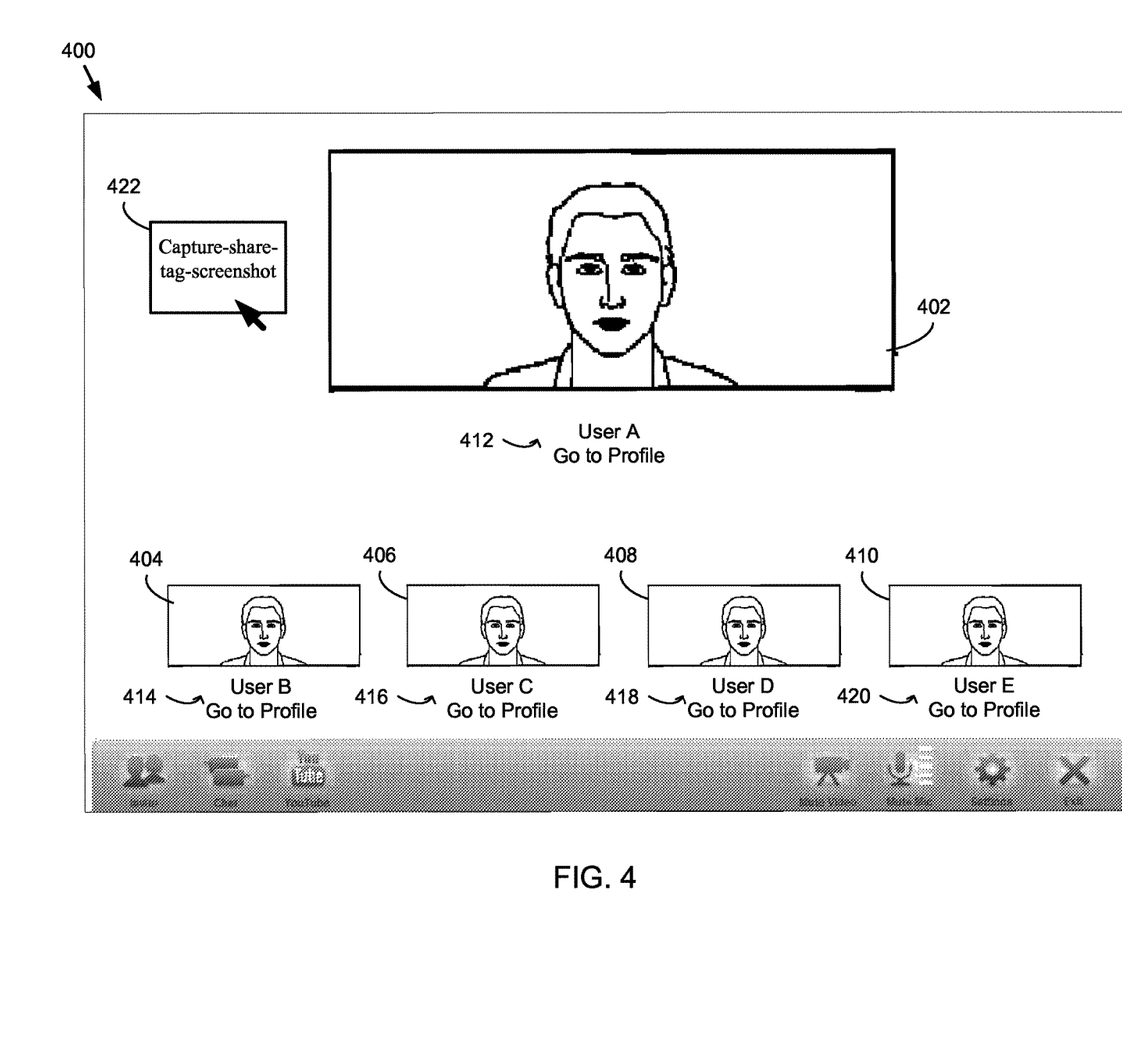
FIG. 4 is a diagrammatic view of a screen image rendered by the tagging process of FIG. 1 in accordance with an embodiment of the present disclosure.

In some embodiments, each participant screen may have participant identification information associated therewith. For example, participant screen 402 may have identification information 412 rendered, in this case identifying the participant as User A. Similarly, participant screens 404, 406, 408, and 410 may each include corresponding identification information 414, 416, 418, and 420. As shown in FIG. 4, the identification information may include at least one of a participant's name and/or a link to a webpage associated with a participant (e.g., "Go to Profile"). Some or all of the identification information may or may not be accessible to the various participants of online video group discussion as is discussed in further detail hereinbelow.

As discussed above and referring again to FIGS. 3-6, tagging process 10 may include enabling (302), using the one or more computing devices, a capture of an image associated with an online group discussion, said online group discussion including two or more participants. Assume for the purposes of this example, that user "User D" associated with participant screen 408 wishes to take a screenshot of display screen 400. In this way, tagging process 10 may enable the capture of an image associated with the online group discussion by providing capture-share-tag screenshot icon 422. For the purposes of this example, icon 422 may be a user-selectable button, however, it should be noted that the capture-share-tag functionality described herein may be activated using any suitable approach.

The term "screenshot" or "screen capture" as used herein, may refer to an image taken by a computing device to record the visible items displayed on the monitor, television, smartphone, or any visual output device. In order to effectuate the screen capture, tagging process 10 may utilize any suitable screen capture technique, such as those known in the art.

In some embodiments, icon 422 may be hidden after selection and prior to the screen capture. This may occur, for example, after one of the users has selected capture-share-tag screenshot icon 422. Accordingly, icon 422 may not appear in the screenshot. This feature may be enabled using any suitable approach, for example, through a settings feature, drop-down menu, etc. Some operating systems (e.g. Mac OSX, Microsoft Windows, iOS, Android, HP WebOS, X Window System, etc.) include screenshot functionality, which may be used in accordance with tagging process 10. Additionally and/or alternatively, tagging process 10 may utilize one or more third party screen capture software tools such as those known in the art.

In some embodiments, the method may further include allowing (304) an automatic tagging, using the one or more computing devices, of the image associated with the online group discussion, the image including a visual representation of a first participant of the two or more participants of the online group discussion. For example, tagging process 10 may tag each image shown in each of participant screens 402, 404, 406, 408, and 410 with the identity of the participant shown in the image. In this way, the resultant screenshot may include the name "User A" with participant screen 402, "User B" with participant screen 404, "User C" with participant screen 406, "User D" with participant screen 408, and "User E" with participant screen 410.

Figure 6:
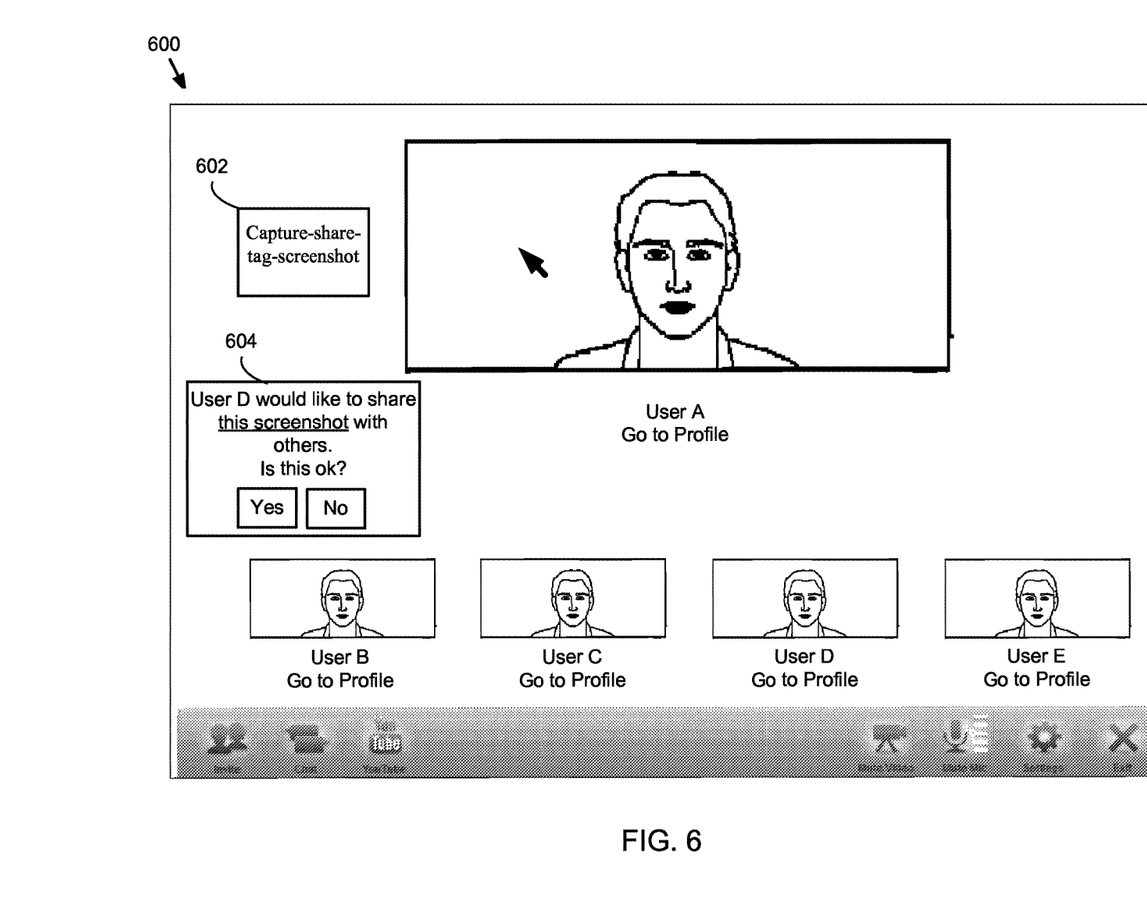
FIG. 6 is a diagrammatic view of a screen image rendered by the tagging process of FIG. 1 in accordance with an embodiment of the present disclosure Like reference symbols in the various drawings indicate like elements.

Referring now to FIG. 6, in some embodiments, tagging process 10 may provide (306) one or more of the participants with an option to indicate whether to approve distribution of the tagged image. FIG. 6 shows one embodiment of a display screen 600, which may be provided in accordance with the tagging process of the present disclosure. The option may be provided in any number of ways. For example, and as shown in FIG. 6, a screenshot sharing display 604 may be generated by tagging process 10 and may be provided to one or more of the participants of the online group discussion.

In some embodiments, screenshot sharing display 604 may include a description of the screenshot and the participant who is interested in distributing the screenshot. In this particular example, display 604 may indicate that "User D would like to share this screenshot with others. Is this OK?". Some or all of the remaining participants, e.g. Users A, B, C, and E may be provided with display 604. Accordingly, each participant may authorize or decline to share the screenshot. Additionally and/or alternatively, each user may be provided with an option to share the screenshot with a particular group or subgroup of people (i.e., restrict access to a certain individual or group).

In some embodiments, tagging process 10 may receive an indication from the first participant whether to approve the distribution of the tagged image. For example, if Users A, B, C, and E each select "Yes" within display 604 an indication of approval may be provided, e.g., to a computing device such as server computing device 12 depicted in FIG. 1. Alternatively, if one or more of Users A, B, C, and E select "No" within display 604 an indication of denial may be provided.

In some embodiments, tagging process 10 may also include receiving an indication from the first participant whether to approve the distribution of the tagged image. When the indication from the first participant whether to approve the distribution of the tagged image indicates approval of the distribution, tagging process 10 may further include distributing (308) the tagged image, based at least in part on the indication of approval of distribution of the tagged image. As discussed above, the distribution may occur after some or all of the participants approve the distribution. Distribution may include transmitting the tagged image to a computing device that is not associated with the online group discussion. For example, a User F who may not be associated with the online group discussion may receive the tagged image or screenshot via one or more networks (e.g. networks 14, 18, etc.). In some embodiments, the tagged image may be provided to a social networking stream (e.g. GOOGLE+, FACEBOOK, etc.). Tagging process 10 may further include storing the image or screenshot in one or more memory devices, e.g. storage device 16 coupled to computing device 12.

In some embodiments, the tagged image may take on any number of forms including, but not limited to, a screenshot and a video image. The tagged image may include a plurality of images, each image corresponding to a visual representation of a different participant of the two or more participants of the online group discussion. As shown in FIGS. 4 and 6, the tagged image may be tagged with identification information corresponding to each participant of the two or more participants of the online group discussion.

In some embodiments, tagging process 10 may be used in a variety of different implementations. For example, tagging process 10 may be included as part of a social networking website, as a user interface in a chatroom, video chat, video conferencing, etc.

In some embodiments, a profile may refer to a representation of an individual or a group of individuals on a member network (e.g. a GOOGLE+ profile). A profile may generally include details such as a name, a hometown, interests, pictures, and other information characterizing an individual or a group of individuals. A profile may be public if other network members (or even the general public) do not require the consent of the represented individual or group in order to access the profile. In this way, it should be noted that any or all of the participants of the online video group discussion may, at their own choosing, opt out of sharing access to their profile and/or identification information to other participants.

In some embodiments, the other participants (e.g., User B, User C, User A, and User E) may be restricted from viewing and/or accessing the identification information of User D unless authorized. For example, the hyperlink associated with each user's webpage may be disabled and/or enabled based upon an authorization of one or more of the participants.

Referring again to FIG. 5, one embodiment of a tagging process 500 is provided. Tagging process 500 may include enabling (502), using the one or more computing devices, a capture of an image associated with an online group discussion having a plurality of participants. Assume for the purposes of this example, that user "User D" associated with participant screen 408 wishes to take a screenshot of display screen 400. In this way, tagging process 10 may enable the capture of an image associated with the online group discussion by providing capture-share-tag screenshot icon 422. For the purposes of this example, icon 422 may be a user-selectable button, however, it should be noted that the capture-share-tag functionality described herein may be activated using any suitable approach. In some embodiments, the image may include a plurality of visual representations, each visual representation corresponding to one of the plurality of participants of the online group discussion. For example, and as shown in FIG. 4, the visual representation of each participant is shown in participant screens 402, 404, 406, 408, and 410 with the identity of the participant shown in the image Additionally and/or alternatively, tagging process 500 may further include allowing (504) an automatic tagging, using the one or more computing devices, of the image associated with the online group discussion, wherein the automatic tagging includes tagging each of the plurality of visual representations. For example, tagging process 10 may tag each image shown in each of participant screens 402, 404, 406, 408, and 410 with the identity of the participant shown in the image. In this way, the resultant screenshot may include the name "User A" with participant screen 402, "User B" with participant screen 404, "User C" with participant screen 406, "User D" with participant screen 408, and "User E" with participant screen 410.

Figure 5:
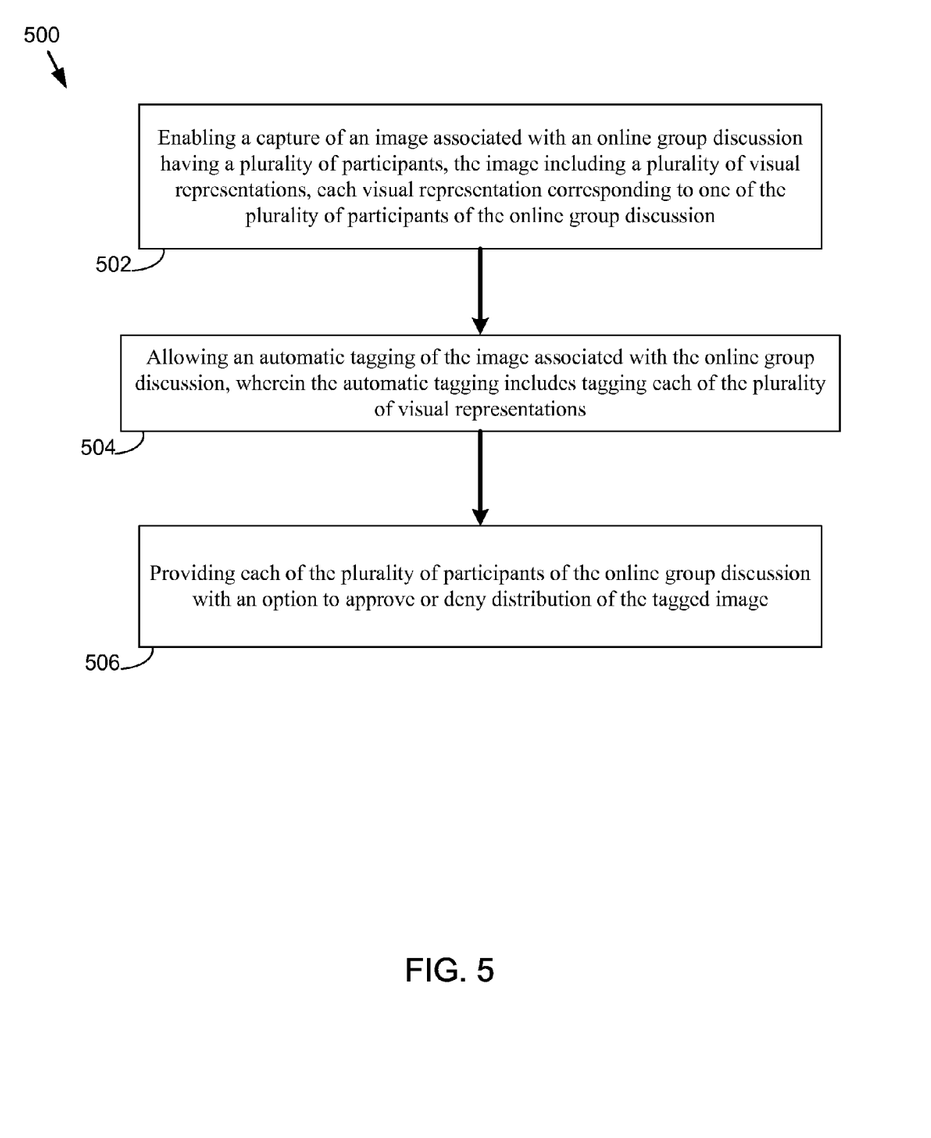
FIG. 5 is a flowchart of an additional tagging process in accordance with an embodiment of the present disclosure.

Additionally and/or alternatively, tagging process 500 may further include providing (506), using the one or more computing devices, each of the plurality of participants of the online group discussion with an option to approve or deny distribution of the tagged image. In some embodiments, screenshot sharing display 604 may include a description of the screenshot and the participant who is interested in distributing the screenshot. In this particular example, display 604 may indicate that "User D would like to share this screenshot with others. Is this OK?". Some or all of the remaining participants, e.g. Users A, B, C, and E may be provided with display 604. Accordingly, each participant may authorize or decline to share the screenshot. Additionally and/or alternatively, each user may be provided with an option to share the screenshot with a particular group or subgroup of people (i.e., restrict access to a certain individual or group).

In some embodiments, tagging process 10 may receive an indication from the first participant whether to approve the distribution of the tagged image. For example, if Users A, B, C, and E each select "Yes" within display 604 an indication of approval may be provided, e.g., to a computing device such as server computing device 12 depicted in FIG. 1. Alternatively, if one or more of Users A, B, C, and E select "No" within display 604 an indication of denial may be provided.

In some embodiments, tagging process 10 may also include receiving an indication from the first participant whether to approve the distribution of the tagged image. When the indication from the first participant whether to approve the distribution of the tagged image indicates approval of the distribution, tagging process 10 may further include distributing (308) the tagged image, based at least in part on the indication of approval of distribution of the tagged image. As discussed above, the distribution may occur after some or all of the participants approve the distribution. Distribution may include transmitting the tagged image to a computing device that is not associated with the online group discussion. For example, a User F who may not be associated with the online group discussion may receive the tagged image or screenshot via one or more networks (e.g. networks 14, 18, etc.). In some embodiments, the tagged image may be provided to a social networking stream (e.g. GOOGLE+, FACEBOOK, etc.). Tagging process 10 may further include storing the image or screenshot in one or more memory devices, e.g. storage device 16 coupled to computing device 12.

Additionally and/or alternatively, embodiments described herein may allow for designating a circle/friend list/group/etc. to share the tagged image with. For example, one or more users may be present in an online video conference and may wish to share the tagged image with certain subgroups of their contacts. In this way, a user may select "friends" and "work friends", and then the resulting tagged photo may be shared with the users present in both the user's "friends" and the user's "work friends" circles. Numerous additional embodiments are also within the scope of the present disclosure.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A method executing on one or more computing devices, said method comprising:

during an online discussion including two or more participants, providing a graphical user interface display configured to show two or more real-time video displays, each of the two or more real-time video displays corresponding to each of the two or more participants;

activating capture of an image associated with an online group discussion and including a visual representation of a first participant of the two or more participants;

allowing automatic tagging of the image with an identification of the first participant;

activating sharing of the image during the online discussion, wherein the graphic user interface includes a single element for activating capture and activating sharing; and distributing the image, in response, at least in part, to activating sharing.

2. The method of claim 1, wherein the distributing the image includes providing the image to a computing device that is not associated with the online group discussion.

3. The method of claim 1, wherein the distributing the image includes providing the image to a social networking stream.

4. The method of claim 3, wherein the image includes a plurality of visual representations, each visual representation for a different participant of the online group discussion.

5. The method of claim 4, wherein allowing the automatic tagging includes tagging with identification of each participant of the online group discussion.

6. The method of claim 1, wherein the image is at least one of a screenshot and a video image.

7. The method of claim 1, wherein the single element is hidden from the graphic user interface after activating capture and prior to capture.

8. A computer program product comprising a non-transitory computer readable storage medium having a plurality of instructions stored thereon, which when executed by a processor, cause the processor to perform operations comprising:

during an online discussion including two or more participants, providing a graphical user interface display configured to show two or more real-time video displays, each of the two or more real-time video displays corresponding to each of the two or more participants;

activating at the graphical user interface associated with the one or more computing devices, capture of an image associated with an online group discussion and including a visual representation of a first participant of the two or more participants;

allowing automatic tagging of the image with an identification of the first participant;

activating sharing of the image during the online discussion, wherein the graphic user interface includes a single element for activating capture and activating sharing; and distributing the image in response, at least in part, to activating sharing.

9. The computer program product of claim 8, wherein the distributing the image includes providing the image to a computing device that is not associated with the online group discussion.

10. The computer program product of claim 8, wherein the distributing the image includes providing the image to a social networking stream.

11. The computer program product of claim 10, wherein the image includes a plurality of visual representations, each visual representation for a different participant of the online group discussion.

12. The computer program product of claim 11, wherein allowing the automatic tagging further includes tagging with identification of each participant of the online group discussion.

13. The computer program product of claim 8, wherein the image is at least one of a screenshot and a video image.

14. The computer program product of claim 8, wherein the single element is hidden from the graphic user interface after activating capture and prior to capture.

15. A computing system comprising:

a graphical user interface configured to provide two or more real-time video displays during an online group discussion including two or more participants, each of the two or more real time video displays corresponding to each of the two or more participants, and one or more processors configured to activate a capture of an image associated with the online group discussion, the one or more processors being further configured to allow an automatic tagging of the image with an identification of the first participant, the one or more processors being further configured to activate a sharing of the image during the online discussion, wherein the graphical user interface provides a single user interface element for the activating capture and activating sharing, and the one or more processors being further configured to distribute the image in response, at least in part, to activating sharing.

16. The computing system of claim 15, wherein the distributing the image includes providing the image to a computing device that is not associated with the online group discussion.

17. The computing system of claim 15, wherein the distributing the image includes providing the image to a social networking stream.

18. The computing system of claim 17, wherein the image includes a plurality of visual representations, each visual representation for a different participant of the online group discussion.

19. The computing system of claim 18, wherein allowing the automatic tagging includes tagging with identification of each participant of the online group discussion.

20. The computing system of claim 15, wherein the image is at least one of a screenshot and a video image.

* * * * *